United States Patent Office 2,732,132
Patented Jan. 24, 1956

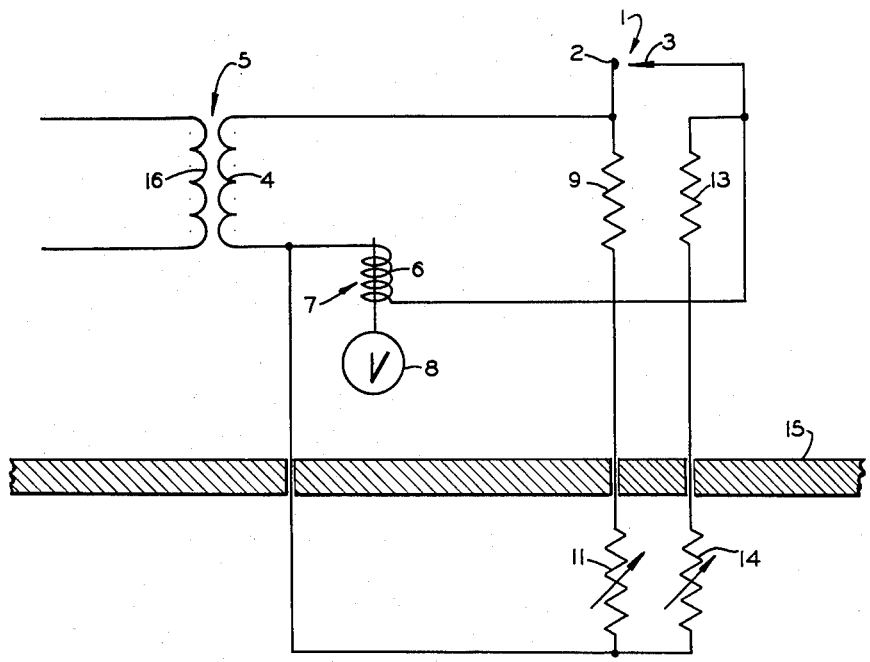

2,732,132

FAST CYCLING THERMOSTAT CIRCUIT

Henry R. Hulett, Redwood City, Calif., assignor to Detroit Controls Corporation, Detroit, Mich., a corporation of Michigan Application August 23, 1954, Serial No. 451,558

2 Claims. (Cl. 236—91)

This invention relates to and in general has for its object the provision of a rapid cycling thermostat control circuit and constitutes an improvement to the circuit disclosed and claimed in my co-pending application Serial Number 381,348, filed on September 21, 1953 for "Anticipatory Control System."

The house heating industry has long recognized the problem created when large time intervals occur between operations of warm air furnace burners. One result of long off periods, of course, is actual change of air temperature at the thermostat. Another result is stratified air, the condition often referred to as "cold 70." A third is the well known popping and cracking as a furnace heats up or cools down and the noise as a fan starts and stops. Field and laboratory studies by the American Gas Association have indicated that greater comfort can be maintained and more nearly uniform temperatures effected at all room levels from floor to ceiling if the furnace output is reduced to closely approximate the instantaneous heat loss of the building. (American Gas Association Bulletin 51, "The Effects of Modulated Operation on Performance of Gas Warm Furnace").

One way to approach this condition is to modulate the instantaneous input to the furnace by a modulating valve. Such a valve can be made to work over a range of pressures of at least ten to one. However, this variation gives a range of heat input of only about three to one since the gas flow through a valve varies approximately as the square root of the pressure. Over the lower 30% of the heat input range, modulation is quite difficult to achieve. It is, however, precisely in this range that long burner off periods may be anticipated. In addition, such valves are unavoidably more complex than simple on-off valves, and it has been troublesome to use the same valve for different burner sizes.

Because of the problems associated with modulating valves, the heating industry in general has turned to cycling operation of furnaces. The primary reason for this has been to reduce the temperature overshoot associated with long on-off burner cycles. In addition some reduction of stratification and of noises associated with heating up and cooling down of the furnace and of fan cycling have resulted, since the heat capacity of the furnace is such that it neither heats up nor cools down completely durng the period of the cycle. Obviously the shorter the cycle time of the burner the smaller the temperature change of the furnace and the less the room temperature change, the stratification and the noise. However, the cycle time associated with existing thermostats can only be reduced by increasing the heat input from the anticipating resistor. This heat input is already so great that it heats the thermostat blade approximately six degrees above room temperature, if the thermostat is on continuously. Thus, assuming a three degree differential in the thermostat blade, the room temperature must be three degrees or more below the desired value for the thermostat to stay on. In other words, the room temperature "droops" up to the three degrees at low outside temperature when the furnace is on for a large percentage of the time. Any increase in this droop would, of course, be very objectionable, especially since the room temperature should actually be warmer when the outside temperature is low, in order to compensate for the increased radiation losses on cold days.

It is possible to reduce the cycle time to a value much shorter than that now used and still provide the desired increase in inside temperature at low outside temperature, by making use of the properties of thermistors. One way is to increase the heat input into the blade from the anticipating resistor and counteract the resulting droop by increasing the compensation in the inside outside thermostat described previously. The major draw-back to this approach is that a large temperature difference must be inserted into the blade by the compensating circuit, if the heat into the blade from the anticipating resistor is increased enough to speed up the cycle for the desired amount.

Voltage variations in the power supply feeding the thermistor circuit might then cause relatively large temperature variations in the thermostat, and thus in the room, so a voltage stabilized supply would be desirable. In addition it might be hard to match the compensating circuit temperature change with the thermostat droop in such a way as to provide a reasonably linear increase in inside temperature as outside temperature drops. This is especially so since the net change in inside temperature will result from the difference in two quantities, (the droop and the compensating temperature change) which are much larger than the net change.

More specifically, it is the object of this invention to overcome most of these difficulties by placing a second outside thermistor in series with the anticipating resistor. The heat input into the blade can then be increased greatly at high outside temperatures, corresponding to low percentages of operation, to give a very short cycle. At low outside temperatures, on the other hand, where long off periods for the furnace will not normally occur, the thermistor's resistance will be high, reducing the heat input to the anticipating resistor, and thus reducing the droop to a small amount which can easily be overcome by the compensating circuit.

The invention possesses other advantageous features, some of which, with the foregoing, will be set forth at length in the following description where that form of the invention which has been selected for illustration in the drawing accompanying and forming a part of the present specification, is outlined in full. In said drawing, one form of the invention is shown, but it is to be understood that it is not limited to such form, since the invention as set forth in the claims may be embodied in other forms.

The single figure shown in the drawing is a diagram of a rapid cycling thermostat circuit embodying the objects of my invention.

The circuit illustrated in this diagram comprises a thermostat generally designated by the reference numeral 1 (Detroit Controls Corporation #411) and including a blade 2 and a contact point 3. Connected in series with the thermostat 1 is the secondary 4 of a transformer generally designated by the reference numeral 5 and the coil 6 of a solenoid generally designated by the reference numeral 7 and arranged to actuate the fuel valve 8 of a heating furnace. Connected to the blade 2 in close proximity thereto is a resistance 9 in series with a thermistor 11. Similarly connected to the thermostat contact 3 is a resistance 13 in series with a thermistor 14. The two thermistors 11 and 14 should have a high negative temperature coefficient of resistance and should be located externally to an outer wall 15 of the building or room the temperature of which is to be regulated by the circuit under consideration. The primary 16 of the transformer should be so related to the secondary 4 that the latter delivers current to the control circuit at about 24 volts.

During the operation of the circuit above described, current continuously flows in closed circuit through the secondary 4 of the transformer, the resistance 9 and the thermistor 11 thereby elevating the temperature of the resistance 9 and in turn the blade 2 of the thermostat 1. Since the thermistor 11 is external to the wall 15 and has a high negative temperature coefficient of resistance the temperature of the resistance 9 will vary directly with the external temperature. This means that the blade 2 is heated more degrees above room temperature at high external temperatures than at low external temperatures. However, in the absence of resistance 13 and thermistor 14, there would be a large variation in room temperature during the thermostat cycle because of two factors: First, the temperature differential between the temperature at which the thermostat blade closes and the temperature at which it opens and, second, the time required for heat to flow from the furnace to the space or room to be heated. This time lag means that the temperature in the room continues to fall from the time that the furnace has just been turned on until the heat has had time to reach the room. Conversely, the temperature in the room continues to rise at the time the furnace has just been turned off until the heat from the furnace at the time of the turnoff has had time to reach the room.

The combination of these two effects leads to an overshoot often causing temperature variations as great as 7-8 degrees. These variations are usually minimized in thermostats by an anticipating resistor which passes current when the thermostat is on, heats up and thus opens the thermostat blade before it normally would open. This expedient reduces the length of the heating cycle, thus decreasing the temperature variation, but only at the expense of introducing "droop" at low outside temperatures. This "droop" is an actual lowering of room temperature at low outside temperatures, caused by the fact that the thermostat is on a higher percentage of the time at low outside temperatures and therefore the heating resistor is on more of the time and an effect is produced approximately the reverse of that produced by the resistor 9 and the thermistor 11.

To retain the desirable short cycle time at high outside temperatures while reducing the droop, the anticipating resistor 13 is placed in series with the thermistor 14. Then the current flowing through the resistor 13 is high at high outside temperatures and the cycle time is decreased as above mentioned. However, at low outside temperatures the resistance of the thermistor 14 is high, the current flowing through resistor 13 is low, and thus the "droop" is low and easily corrected by the resistor 9 and the thermistor 11. At these low outside temperatures, the furnace should be allowed to be on for a long time in each cycle anyway, so that the decrease in the anticipation effect is actually desirable.

Actual tests of the circuit above described have shown that by its use it is possible to:

(1) Vary the inside temperature as a function of the outside temperature in such a way that the inside temperature increases when the outside temperature decreases, maintaining a constant comfort level.

(2) Keep the temperature of the room constant to all intents and purposes during a cycle of the thermostat.

(3) Make the temperature of the furnace outlet air essentially a function of the heat demand, being greater at high heat demands than at low heat demands as in a truly modulating system.

Because of this last point, continuous fan operation will be realized in most cases in a forced air system and furnace noise will be reduced. A noticeable reduction of furnace noise was evident in the test installation.

It might be mentioned that this close control was achieved by the use of a floor furnace and a thermostat located approximately 25 feet away from the furnace.

Night turndown of this unit, if desired, is easily accomplished by shorting out the outside thermistor in the compensating circuit. This increases the heat output of the resistor, lowering the room temperature at which the thermostat operates.

Having thus described my invention, what I claim and desire to secure by Letters Patent is:

1. A control circuit for controlling a heating system comprising: a first permanently closed circuit including a first thermistor having a negative coefficient of resistance, a first resistor and a source of voltage; and a second thermistor having a negative coefficient of resistance and a second resistor shunted across said first thermistor and first resistor through a thermostat including a blade and a contact, said first and second resistors being located in heat transfer relation with respect to said blade.

2. A control circuit for controlling a heating system comprising: a first permanently closed circuit including a first thermistor, a first resistor and a source of voltage; a second thermistor and a second resistor shunted across said first thermistor and first resistor through a thermostat including a blade and a contact, said first and second resistors being located in heat transfer relation with respect to said blade, said thermostat being arranged to be mounted within a building and said thermistors being arranged to be mounted external to said building and each of said thermistors having a negative coefficient of resistance.

References Cited in the file of this patent

UNITED STATES PATENTS

| | | |
|---|---|---|
| 1,997,559 | Hajek | Apr. 9, 1935 |
| 2,183,874 | Shivers | Dec. 19, 1939 |
| 2,339,635 | Hall | Jan. 18, 1944 |
| 2,482,820 | Wolfson | Sept. 27, 1949 |
| 2,628,034 | Ray | Feb. 10, 1953 |